United States Patent [19]
Tsuchiya et al.

[11] Patent Number: 5,883,200
[45] Date of Patent: *Mar. 16, 1999

[54] COATING COMPOSITION

[75] Inventors: Harufumi Tsuchiya, Nara-ken; Hiroaki Omoto, Nishinomiya; Hiroyuki Mishima, Nagaokakyo; Tsunehiko Toyoda, Yokohama, all of Japan

[73] Assignee: Dai Nippon Toryo Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 701,693

[22] Filed: Aug. 22, 1996

[30] Foreign Application Priority Data

Aug. 29, 1995 [JP] Japan ................................. 7-220068

[51] Int. Cl.$^6$ .............................. C08L 85/02; C08L 61/32
[52] U.S. Cl. ......................... 525/517; 523/177; 524/597; 524/610
[58] Field of Search .......................... 525/517; 524/597, 524/610, 593, 612; 523/177

[56] References Cited

U.S. PATENT DOCUMENTS

| | | | |
|---|---|---|---|
| 4,554,090 | 11/1985 | Jones | 252/181 |
| 4,578,438 | 3/1986 | Demmer et al. | 524/595 |
| 4,585,703 | 4/1986 | Taguchi et al. | 428/446 |
| 4,966,630 | 10/1990 | Okuda | 106/426 |
| 5,322,870 | 6/1994 | Lin | 524/132 |

FOREIGN PATENT DOCUMENTS

| | | |
|---|---|---|
| 0 012 205 | 6/1980 | European Pat. Off. . |
| 2 109 383 | 6/1983 | United Kingdom . |

*Primary Examiner*—Tae Yoon
*Attorney, Agent, or Firm*—Oblon, Spivak, McClelland, Maier & Neustadt, P.C.

[57] ABSTRACT

A coating composition characterized in that it contains a compound obtained by reacting an amino resin with an organic polyphosphonic acid.

5 Claims, No Drawings

COATING COMPOSITION

The present invention relates to a coating composition for preventing rust or rust stain. More particularly, it relates to a coating composition for preventing rust or rust stain for e.g. steel structures such as tanks, bridges, vehicles, ships or plants, metal products such as electronic devices or steel household equipments, and usual buildings.

Heretofore, it has been common to apply to steel structures or metal products a multi-layered coating film formed by a combination of a rust preventive undercoating material containing a lead-type rust preventive pigment such as minium, litharge or lead cyanamide, a chromate compound such as zinc chromate or strontium chromate, or a phosphate compound such as zinc phosphate or aluminum phosphate, and a top coating material for clean finish which contains no such rust preventive pigment.

Such a rust preventive undercoating material has an effect of slowing down the corrosion speed of the substrate metal, but has no substantial effect of preventing rust which forms at pinholes or scratch marks of the coating films. Accordingly, rust once formed, will dissolve and run with rain water or condensed water, or with splashed sea water in the case of ships or steel structures built along sea shores, to stain the surface of the top coating film with a brown color and thus to spoil the appearance of the coating film. Thus, with such a conventional combination of an undercoating material and a top coating material, staining of the coating film due to rust has been likely to result.

For the purpose of preventing staining of a coating film due to rust, Japanese Unexamined Patent Publication No. 219273/1983 proposes a rust preventive coating material having a salt made of a polyvalent metal cation such as calcium and an organic polyphosphonic acid incorporated. However, even if such a salt is incorporated, no adequate effect for preventing rust stain can be obtained if the amount is small. Not only that, there has been a fatal problem that if such a salt is used in a large amount, not only the rust preventive effect decreases, but also blistering is likely to form in the resulting coating film. Further, there has been a problem that it is difficult to finely pulverize such a salt, whereby it takes a long time for kneading for dispersion.

Further, Japanese Unexamined Patent Publication No. 174474/1991 discloses a coating composition containing a powder of an amine salt compound of an organic polyphosphonic acid. However, such a powder is used in combination with a rust preventive pigment to improve the rust preventive effects, and there has been a problem that such a composition is not suitable for use for a long period of time.

It is an object of the present invention to provide a coating composition which is capable of not only preventing rust of steel structures but also changing brown rust formed at defective portions of the coating film to a colorless substance so that a good appearance can be maintained.

To solve the problems of the prior art, the present inventors have conducted extensive studies for a coating material which has a rust preventive property equal to conventional rust preventive coating materials and which is capable of protecting the coating film surface from staining due to rust over a long period of time. As a result, it has been found that by incorporating a compound obtained by reacting an amino resin with an organic polyphosphonic acid, to a coating composition comprising a binder resin, a solvent, a filler, a coloring pigment and various additives, and coating such a composition, it is possible to prevent rust of steel structures and at the same time to change brown rust which forms at scratch marks or pinholes in the coating film, to a colorless substance so that a good appearance can be maintained. Further, it has also been found that the coating composition containing the compound obtained by reacting the amino resin with the organic polyphosphonic acid, is capable of preventing rust of steel structures even without using any particular rust preventive pigment, whereby environmental pollution by a rust preventive pigment can be avoided.

Thus, the present invention provides a coating composition which contains a compound hereinafter referred to as an organic polyphosphonic acid-modified amino resin or simply as a modified amino resin) obtained by reacting an amino resin with an organic polyphosphonic acid, together with usual components such as a binder resin, a solvent, a filler, a coloring pigment and various additives.

Now, the present invention will be described in detail with reference to the preferred embodiments.

The organic polyphosphonic acid-modified amino resin to be used in the present invention, is a compound obtained by reacting an amino resin with a polyphosphonic acid having at least two phosphonic acid groups per molecule.

Firstly, preferred examples (1) to (5) of the organic polyphosphonic acid to be used in the present invention will be given below.

(1) A hydroxy-alkylidene-1,1-diphosphonic acid of the formula (i):

$$R^1\text{—C(OH)}[PO(OH)_2]_2 \qquad (i)$$

wherein $R^1$ is a monovalent organic group, preferably a $C_{1-12}$ alkyl group. Particularly preferred is ethydronic acid wherein $R^1$ is a methyl group.

(2) An amino compound having two methylenephosphonic acid groups, of the formula (ii):

$$R^2\text{—N}[CH_2PO(OH)_2]_2 \qquad (ii)$$

wherein $R^2$ is a monovalent organic group, preferably an alkyl group such as a n-propyl group, an isopropyl group, a butyl group or a hexyl group.

(3) An alkylenediaminetetra(methylenephosphonic acid) of the formula (iii):

$$[(OH)_2OPCH_2]_2\text{N-}R^3\text{-N}[CH_2PO(OH)_2]_2 \qquad (iii)$$

wherein $R^3$ is a $C_{1-12}$ alkylene group. This compound is particularly preferably ethylenediaminetetra (methylenephosphonic acid) or hexamethylenediaminetetra (methylenephosphonic acid).

(4) An amino-tris(methylenephosphonic acid) of the formula $N[CH_2PO(OH)_2]_3$.

(5) A dialkylenetriaminepenta(methylenephosphonic acid). This compound is particularly preferably diethylenetriaminepenta(methylenephosphonic acid).

The amino resin to be reacted with the organic polyphosphonic acid may, for example, be an addition compound of an amino compound (a) and an aldehyde compound (b), or a condensate of such an addition compound, or a partially or completely etherified amino resin obtained by cocondensing said addition compound or its condensate together with a $C_{1-4}$ alcohol (c).

Such amino resins may, for example, be obtained by carrying out addition reaction of an amino compound (a) with an aldehyde compound (b) in the presence of a basic catalyst, and then, if necessary, carrying out a condensation reaction and an etherification reaction under an acidic condition by an addition of an acid catalyst in a $C_{1-4}$ alcohol (c). The reaction is carried out preferably at a temperature of from 60° to 150° C. for from 0.5 to 10 hours. The molecular weight of the amino resin is usually from 100 to 3000, preferably from 200 to 1000.

Preferred examples of the amino compound (a) include urea, melamine, acetoguanamine, benzoguanamine, cyclohexane carboguanamine, steroguanamine and spiroguanamine. These compounds may be used alone or in combination as a mixture of two or more of them. Among these amino compounds (a), urea, melamin and benzoguanamine are particularly preferred from the viewpoint of costs, crosslinking properties, etc.

Preferred examples of the aldehyde compound (b) include formaldehyde, paraformaldehyde, acetaldehyde, propionaldehyde, butyraldehyde and glyoxal. These compounds may be used alone or in combination as a mixture of two or more of them. Among these aldehyde components (b), formaldehyde, paraformaldehyde and glyoxal are particularly preferred from the viewpoint of costs and reactivity.

The $C_{1-4}$ alcohol (c) is used to stabilize the reaction product of the amino compound with the aldehyde compound. Preferred examples of the alcohol (c) include metyl alcohol, ethyl alcohol, n-propyl alcohol, isopropyl alcohol, n-butyl alcohol, isobutyl alcohol, sec-butanol and tert-butyl alcohol. These alcohols may be used alone or in combination as a mixture of two or more of them. Among these alcohols (c), n-butyl alcohol, isobutyl alcohol, isopropyl alcohol and metyl alcohol are particularly preferred from the viewpoint of the reactivity, costs, etc.

The method for producing the modified amino resin to be used in the present invention, is not particularly limited. However, it may be produced, for example, by reacting the above amino resin with the organic polyphosphonic acid, while dropwise adding the organic polyphosphonic acid to the amino resin in a polar solvent such as water, hot water or an alcohol. In such a case, it is preferred to add water in an amount of from 0.1 to 100 times the total weight of the amino resin and the organic polyphosphonic acid.

The reaction of the amino resin with the organic polyphosphonic acid is an acid-base neutralization reaction, and when they are reacted while being mixed at a reaction temperature of from 10° to 120° C. for from 30 minutes to 5 hours, their salt will be formed in the solution. This salt is purified, dried and, if necessary, concentrated for use as the modified amino resin of the present invention. The proportions of the amino resin and the organic polyphosophonic acid for reaction are preferably such that the amino resin is from 0.5 to 5 mols per one equivalent of a phosphonic acid group.

There is no particular problem when a product coated with the coating composition of the present invention, is used indoors. Whereas, when such a product is used outdoors or when the coating composition is applied to outdoor structures, it is advisable to adjust the solibility of the modified amino resin in water to a level of at most about 5 g/100 ml. Because, when the modified amino resin is hardly soluble, the amount which will be lost from the coating film by e.g. rain water, will be small, whereby the effects for preventing rust or rust stain will be maintained for a long period of time.

The organic polyphosphonic acid-modified amino resin of the present invention is incorporated usually in an amount of from 2 to 75 wt %, preferably from 5 to 50 wt %, in the solid content of the coating material. If the amount of the modified amino resin is less than 2 wt %, the effects of preventing rust stain tend to be inadequate, and if it exceeds 75 wt %, the drying property tends to substantially deteriorate, whereby there will be a delay in attaining the desired level of the coating film properties.

As mentioned above, the coating composition of the present invention employs components of usual coating compositions except that the organic polyphosphonic acid-modified amino resin is incorporated.

As the binder resin, an acrylic resin, an alkyd resin, a vinyl chloride/vinyl acetate copolymer resin, an oil free polyestel resin, a fluorine resin, a silicone resin, an epoxy resin, an unsaturated polyester resin, a polyurethane resin, or a chlorinated rubber resin may, for example, be mentioned. These resins may be used alone or in combination as a mixture of two or more of them. Further, if necessary, a modifying resin such as a petroleum resin or a xylene resin, may be incorporated for use.

As the solvent, an aromatic hydrocarbon solvent, an alcohol solvent, a glycol ether solvent, a glycol ether ester solvent, a ketone solvent, an ester solvent or water, may, for example, be mentioned.

As the filler, calcium carbonate, barium sulfate and talc may, for example, be employed. As the coloring pigment, titanium dioxide or iron oxide may, for example, be used. As the rust-preventive pigment, zinc phosphate, aluminum phosphate, sodium zinc molybdate, barium metaborate, zinc white, potassium chromate, zinc chromate, minium or litharge may, for example, be mentioned. In the present invention, a rust preventive pigment is not an essential component, but may be optionally incorporated, as the case requires.

The coating composition of the present invention may be formulated in a various types of coating materials, such as an organic solvent type, a water-base type and a solventless type. Further, the coating composition may be prepared to be suitable for various types of drying systems such as room temperature drying, forcible drying, baking and drying, and curing by active energy rays.

The coating composition of the present invention may be coated directly on metal parts, or may be applied as a top coating material on a coating film of usual under-coating material. Further, it may be used for finishing an object to be coated which by itself does not form rust, like a concrete structure or a building made of wood, but which is likely to be stained with rust received from iron parts located nearby.

The coating amount of the coating composition may be determined by the coating amount of the organic polyphosphonic acid-modified amino resin required for the prevention of rust stain. It is usually preferred to apply the coating so that the modified amino resin would be from 5 to 60 g/m², preferably from 10 to 40 g/m², from the viewpoint of the effects for preventing rust stain and the maintenance of the coating film performance. However, the coating amount is not limited to such a specific range.

The coating composition of the present invention may be coated in such a manner that the surface of a coating film or the surface of a bare substrate to be coated, is cleaned by removing a dust, oil, rust, etc. attached thereto then the coating composition is coated by means of a conventional coating means such as a brush, a roller or a spray.

The coating composition of the present invention is a coating composition which is capable of preventing rust of steel structures and which is, at the same time, capable of changing brown rust formed at defective portions of a coating film to a colorless substance thereby to maintain the good appearance. The coating film of such a coating composition is capable of preventing corrosion of iron parts of ships, bridges, vehicles, metals or outer walls of concrete buildings, and even if brown rust has formed once, the coating film is capable of changing such rust to a colorless substance, to prevent staining of the coating film itself.

Now, the present invention will be described in further detail with reference to Preparation Examples for the modified amino resin of the present invention and Working Examples wherein such a modified amino resin is employed. In the following Examples, "parts" and "%" are "parts by weight" and "percent by weight", respectively.

PREPARATION EXAMPLE 1

Preparation of a Modified Amino Resin from 1-hydroxy ethylidene-1,1-diphosphonic acid and a melamine-aldehyde Addition Condensate Into a flask equipped with a stirrer and a reflux condenser, 2500 parts of deionized water, 126 parts of melamine (manufactured by Katayama Kagaku KK) and 7.5 parts of 80% paraform were charged, heated to 100° C. and maintained at that temperature for 30 minutes to obtain an aldehyde addition condensate of melamine having a molecular weight of from 100 to 300.

Then, 172 parts of a 60% aqueous solution of 1-hydroxyethylidene-1,1-diphosphonic acid ("DICEST #2010", tradename, manufactured by Monsant Japan) was dropwise added thereto from a dropping funnel over a period of 30 minutes with stirring, and stirring was continued at 100° C. for one hour. The mixture was cooled to room temperature, and a formed white resin precipitate was washed with deionized water repeatedly until the pH of the filtrate became neutral. After the filtration, the precipitate was dried at 110° C. to obtain a modified amino resin A as a white resin powder. The yield was 98.2%.

PREPARATION EXAMPLE 2

Preparation of a Modified Amino Resin from amino tris(methylenephosphonic acid) and a melamine-aldehyde Addition Condensate Into a flask equipped with a stirrer and a reflux condenser, 2500 parts of deionized water, 126 parts of melamine and 37.5 parts of 80% paraform were charged, then heated to 100° C. and maintained at that temperature for 30 minutes to obtain an aldehyde addition condensate of melamine. Then, 300 parts of a 50% aqueous solution of aminotris (methylenephosphonic acid) ("DICEST #2000", tradename, manufactured by Monsant Japan) was dropwise added thereto over a period of 30 minutes with stirring, and stirring was continued for one hour at 100° C. The mixture was cooled to room temperature, and a formed white resin precipitate was washed with deionized water repeatedly until the pH became neutral. After the filtration, the precipitate was dried at 110° C. to obtain a modified amino resin B as a white resin powder. The yield was 97.4%.

PREPARATION EXAMPLE 3

Preparation of a Modified Amino Resin from 1-hydroxy ethylidene-1,1-diphosphonic acid and a melamine-aldehyde Addition Condensate Into a flask equipped with stirrer and a reflux condenser, 2500 parts of deionized water, 126 parts of melamine (manufactured by Katayama Kagaku KK) and 75 parts of 80% paraform were charged, then heated to 100° C. and maintained at that temperature for 30 minutes to obtain an aldehyde addition condensate of melamine. Then, 172 parts of a 60% aqueous solution of 1-hydroxyethylidene-1,1-diphosphonic acid ("DICEST #2010", manufactured by Monsant Japan) was dropwise added thereto over a period of 30 minutes by means of a dropping funnel, with stirring, and then stirring was continued for one hour at 100° C. The mixture was cooled to room temperature, and a formed white resin precipitate was washed with deionized water repeatedly until the pH of the filtrate became neutral. After the filtration, the product was dried at 110° C. to obtain a white resin powder (modified amino resin C). The yield was 97.4%.

PREPARATION EXAMPLE 4

Preparation of a Modified Amino Resin from 1-hydroxyethylidene-1,1-diphosphonic acid and a benzoguanamine aldehyde Adduct Into a flask equipped with a stirrer and a reflux condenser, 2500 parts of cellosolve solvent, 187.2 parts of benzoguanamine (manufactured by Nippon Shokubaikagaku Kogyo KK) and 37.5 parts of 80% paraform were charged, then heated to 50° C. and maintained at that temperature for one hour to obtain an aldehyde adduct of benzoguanamine. Then, 172 parts of a 60% aqueous solution of 1-hydroxyethylidene-1,1-diphosphonic acid ("DICEST #2010", tradename, manufactured by Monsant Japan) was dropwise added over a period of 30 minutes by means of a dropping funnel, with stirring, and stirring was continued at 50° C. for one hour. Further, 1000 parts of deionized water was added thereto, and the mixture was cooled to room temperature. Then, a formed white resin precipitate was washed with deionized water repeatedly until the pH of the filtrate became neutral. After the filtration, the product was dried at 110° C. to obtain a white resin powder (modified amino resin D). The yields was 98.3%.

PREPARATION EXAMPLE 5

Preparation of a Compound of 1-hydroxyethylidene-1,1-diphosphonic acid with a Melamine Resin Into a flask equipped with a stirrer and a reflux condenser, 500 parts of butyl cellosolve was charged. Then, 320 parts of a 80% aqueous solution of a methylated melamine resin ("SUMIMAARU M40W", tradename, manufactured by Sumitomo Chemical Co.,Ltd.) was dissolved therein with stirring. This solution was heated to 80° C., and 167 parts of a 60% aqueous solution of 1-hydroxy ethylidene-1,1-diphosphonic acid ("DICEST #2010", tradename, manufactured by Monsant Japan) was dropwise added over a period of 30 minutes by means of a dropping funnel, and stirring was continued for one hour. The mixture was transferred to an evaporator and concentrated under reduced pressure to obtain a transparent liquid (a solution of a modified amino resin E) having a solid content of 60.8% and a viscosity of 26 stokes (at 25° C.).

PREPARATION EXAMPLE 6

Preparation of a Modified Amino Resin from ethylenediaminetetra(metylenephosphonic acid) and a melamine-aldehyde Addition Condensate Into a flask equipped with a stirrer and a reflux condenser, 2500 parts of deionized water, 126 parts of melamine and 37.5 parts of 80% paraform were charged, then heated to 100° C. and maintained at that temperature for 30 minutes to obtain an aldehyde addition condensate of melamine. Then, 121 parts of ethylenediamine tetra(methylphosphonic acid) ("DICEST #2041", tradename, manufactured by Monsant Japan) was added over a period of 30 minutes with stirring, and stirring was continued at 100° C. for one hour. The mixture was cooled to room temperature, and a formed white resin precipitate was washed with deionized water repeatedly until the pH of the filtrate became neutral. After the filtration, the precipitate was dried at 110° C. to obtain a modified amino resin F as a white resin powder. The yield was 96.8%.

PREPARATION EXAMPLE 7

Preparation of a Compound of 1-hydroxyethylidene-1,1-diphosphonic acid with a Melamine Resin Into a flask equipped with a stirrer and a reflux condenser, 500 parts of butyl cellsolve was charged, and then, 340 parts of a 60% butanol solution of a butylated melamine resin ("Yuban 28–60", tradename, manufactured by Mitsui Toatsu Chemical Co.,Ltd.) was dissolved therein with stirring. This solution was heated to 80° C., and 167 parts of a 60% aqueous solution of 1-hydroxyethylidene-1,1-diphosphonic acid ("DICEST #2010", tradename, manufactured by Monsant Japan) was dropwise added thereto over a period of 30 minutes by means of a dropping funnel, followed by stirring for one hour. The mixture was transferred to an evaporator and concentrated under reduced pressure to obtain a transparent liquid (a solution of a modified amino resin G) having a solid content of 59.6% and a viscosity of 45 stokes (at 25° C.).

PREPARATION EXAMPLE 8

Preparation of a Modified Amino Resin from n-butylamino(methylenephosphonic acid) and a melamine-aldehyde Addition Condensate Into a flask equipped with a stirrer and a reflux condenser, 2500 parts of deionized water, 126 parts of melamine and 37.5 parts of 80% paraform were charged, then heated to 100° C. and maintained at that temperature for 30 minutes to obtain an aldehyde addition condensate of melamine. Then, 250 parts of a 50% aqueous solution of n-butylamino (methylenephosphonic acid) was added over a period of 30 minutes with stirring, and stirring was continued at 100° C. for one hour. The mixture was cooled to room temperature, and then a formed white resin precipitate was washed with deionized water repeatedly until the pH of the filtrate became neutral. After the filtration, the precipitate was dried at 110° C. to obtain a modified amino resin H as a white resin powder. The yield was 98.1%.

EXAMPLE 1

5 Parts of the modified amino resin A, 40 parts of an alkyd resin varnish ("Beckozol J 557", tradename, manufactured by Dainippon Ink Chemical Industries, Co. Ltd.), 15 parts of rutile titanium oxide and 22 parts of mineral spirit were kneaded for 10 hours by means of a ballmill. Then, 15 parts of the above identified varnish and 3 parts of an additive such as a drying agent, were further added to obtain a coating material.

The particle size of the obtained coating material was measured by method A of JIS K-5400 and found to be 5 μm. This coating material was coated on a degreased and polished soft steel plate by an air spray gun so that the dried film thickness would be 35 μm, followed by natural drying for seven days. With respect to the coated plate, a salt spray test and a moisture resistance test were carried out. The results are shown in Table 2.

EXAMPLES 2 TO 10

With a composition as identified in Table 1, a coating material was prepared in the same manner as in EXAMPLE 1, and using the coating material, a coated plate was prepared and subjected to the tests. The results are shown in Table 2.

EXAMPLE 11

15 Parts of the modified amino resin A, 40 parts of an acrylic polyol varnish ("Acrydic A-801", tradename, manufactured by Dainippon Ink Chemical Industries, Co. Ltd.), 15 parts of rutile titanium oxide, 10 parts of xylol and 10 parts of butyl acetate were kneaded for 10 hours by means of a ballmill. Then, 10 parts of the above-identified varnish was further added to obtain a main agent. The particle size of the obtained main agent was 5 μm.

To 100 parts by weight of the main agent, 18.7 parts of a curing agent solution [40 parts of a polyisocyanate compound ("Sumijule 75", tradename, manufactured by Sumitomo Byer Urethane KK) and 40 parts of butyl acetate] was added to obtain a coating material. The viscosity of this coating material was adjusted by using 25 parts of xylene, 5 parts of butyl acetate and 5 parts of ethylene glycol monoethyl ether acetate, and then a coated plate was prepared and subjected to tests in the same manner as in Example 1.

EXAMPLE 12

15 Parts of the modified amino resin A, 45 parts of an alkyd resin varnish ("Hitaroydo 235–50", tradename, manufactured by Hitachi Kasei Kogyo KK), 15 parts of rutile titanium oxide and 7.5 parts of xylol were kneaded for 10 hours by means of a ballmill. Then, 12.5 parts of a melamine resin ("Eban 20SE-60", tradename, manufactured by Mitsui Toatsu Chemical Co.,Ltd.) and 5 parts of n-butanol were further added to obtain a coating material.

The particle size of the obtained coating material was 5 μm.

The viscosity of this coating material was adjusted by an addition of 15 parts of xylene and 5 parts of n-butanol, par 100 parts by weight of the coating material. Then, the coating material was coated on a degreased polished soft steel plate by an air spray gun so that the dried film thickness would be 35 μm, then subjected to setting for 20 minutes and then baked at 120° C. for 30 minutes to obtain a coated plate, which was subjected to the tests.

COMPARATIVE EXAMPLE 1

A coating material was prepared, and a coated plate was prepared and tested, in the same manner as in Example 1 except that 5 parts of condensed aluminum phosphate was added instead of 5 parts of the modified amino resin A. The results are shown in Table 2.

COMPARATIVE EXAMPLE 2

A coating material was prepared, and a coated plate was prepared and tested, in the same manner as in Example 1 except that 5 parts of a calcium phytate powder (manufactured by Mitsui Toatsu Chemical Co.,Ltd.) was added instead of 5 parts of the modified amino resin A. The results are shown in Table 2.

COMPARATIVE EXAMPLE 3

A coating material was prepared, and a coated plate was prepared and tested, in the same manner as in Example 3 except that 25 parts of the above calcium phytate powder is added instead of 25 parts of the modified amino resin A. The results are shown in Table 2.

As is evident from Table 2, the coated plates of the Examples wherein the coating compositions of the present invention were used, were excellent in the corrosion resistance, and the flow of rust fluid was not remarkable, and the coating film defects such as blisters were not observed. On the other hand, the coated plate of Comparative Example 1 wherein a condensed aluminum phosphate as a conventional rust preventive agent was incorporated in the coating material, was excellent in corrosion resistance, but the flow of rust fluid was remarkable. Further, in Comparative Examples 2 and 3 wherein a polyvalent metal cation salt of phytic acid was incorporated in the coating material, if the amount of said salt was small, the flow of rust fluid was remarkable, and if it was large, many blisters formed.

TABLE 1 (1)

| Components of coating material | Examples | | | | | | | | | |
|---|---|---|---|---|---|---|---|---|---|---|
| | 1 | 2 | 3 | 4 | 5 | 6 | 7 | 8 | 9 | 10 |
| Alkyd resin varnish | 40 | 50 | 50 | 50 | 50 | 50 | 50 | 50 | 50 | 50 |
| Modified amino resin A | 5 | 15 | 25 | | | | | | | |
| Modified amino resin B | | | | 15 | | | | | | |
| Modified amino resin C | | | | | 15 | | | | | |
| Modified amino resin D | | | | | | 15 | | | | |
| Modified amino resin E | | | | | | | 25 | | | |
| Modified amino resin F | | | | | | | | 15 | | |
| Modified amino resin G | | | | | | | | | 25 | |
| Modified amino resin H | | | | | | | | | | 15 |
| Titanium oxide | 15 | 15 | 15 | 15 | 15 | 15 | 15 | 15 | 15 | 15 |
| Mineral spirit | 22 | 17 | 7 | 17 | 17 | 17 | 7 | 17 | 7 | 17 |
| Additive | 3 | 3 | 3 | 3 | 3 | 3 | 3 | 3 | 3 | 3 |

TABLE 1 (2)

| Components of coating material | Comparative Examples | | |
|---|---|---|---|
| | 1 | 2 | 3 |
| Alkyd resin varnish | 40 | 40 | 50 |
| Condensed aluminum phosphate | 5 | | |
| Calcium phytate powder | | 5 | 25 |
| Titanium oxide | 15 | 15 | 15 |
| Mineral spirit | 22 | 22 | 7 |
| Additive | 3 | 3 | 3 |

TABLE 2 (1)

| Tested items | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Salt spray test *1) | | | | | | | | | | | | |
| (1) Rust width at cut section | ○ | ○ | ○ | ○ | ○ | ○ | ○ | ○ | ○ | ○ | ○ | ○ |
| (2) Flow of rust fluid | ○ | ○ | ○ | ○ | ○ | ○ | ○ | ○ | ○ | ○ | ○ | ○ |

TABLE 2 (1)-continued

| Tested items | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| (3) Blister other than cut section | ○ | ○ | ○ | ○ | ○ | ○ | ○ | ○ | ○ | ○ | ○ | ○ |
| Moisture resistance test *2) | ○ | ○ | ○ | ○ | ○ | ○ | ○ | ○ | ○ | ○ | ○ | ○ |

TABLE 2 (2)

| Tested items | Comparative Examples | | |
|---|---|---|---|
| | 1 | 2 | 3 |
| Salt spray test *1) | | | |
| (1) Rust width at cut section | ○ | Δ | ○ |
| (2) Flow of rust fluid | X | X | ○ |
| (3) Blister other than cut section | ○ | ○ | X |
| Moisture resistance test *2) | ○ | ○ | X |

1) In accordance with 7 and 8 of JIS K-5400. Cross cut was imparted to an upper half of the coated plate, whereupon a salt water was sprayed for 120 hours.
  (1) Rust width of cut section (width of rust progressed from cut section)
    ○: Within 2 mm on one side
    Δ: From 3 to 4 mm on one side
    x: More than 4 mm on one side
  (2) Flow of rust fluid (the distance of the flow of brown rust fluid from the lower end of the cut section)
    ○: Within 10 mm
    Δ: From 11 to 29 mm
    x: At least 30 mm
  (3) Blisters other than cut section
    ○: No blisters observed
    Δ: Blisters slightly observed
    x: Blisters substantially observed
2) In accordance with 5.18 of JIS K-5652
  ○: No abnormality observed
  Δ: Blistered area: less than 10%
  x: Blistered area: at least 10%

What is claimed is:

1. A coating composition comprising a compound obtained by reacting an amino resin, which is an addition compound of an amino compound (a) selected from the group consisting of urea, melamine, acetoguanamine, benzoguanamine, cyclohexane carboguanamine, steroguanamine and spiroguanamine and an aldehyde (b), or a condensate of such an addition compound, or a partially or completely etherified amino resin obtained by cocondensing said addition compound or its condensate together with a $C_{1-4}$ alcohol (c) selected from the group consisting of methyl alcohol, ethyl alcohol, n-propyl alcohol, isopropyl alcohol, n-butyl alcohol, isobutyl alcohol, sec-butanol and t-butyl alcohol, with an organic polyphosphonic acid selected from the group consisting of:
  (1) an amino compound having two methylenephosphonic acid groups of the formula (i):

wherein $R^2$ is a monovalent organic group;
  (2) an alkylenediaminetetra(methylenephosphonic acid) of the formula (ii):

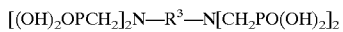 (ii)

wherein $R^3$ is a $C_{1-12}$ alkylene group;

(3) an aminotris(methylenephosphonic acid) of the formula $N[CH_2PO(OH)_2]_3$; and (4) a dialkylenetriaminepenta(methylenephosphonic acid).

2. The coating composition according to claim 1, wherein $R^2$ in the formula (i) is a n-propyl group, an isopropyl group, a butyl group or a hexyl group.

3. The coating composition according to claim 1, wherein the aldehyde compound (b) is at least one member selected from the group consisting of formaldehide, paraformaldehyde, acetaldehyde, propionaldehyde, butylaldehyde and glyoxal.

4. The coating composition according to claim 1, wherein the compound contained in the coating composition is the one obtained by reacting from 0.5 to 5 mols of the amino resin per one equivalent of a phosphonic acid group.

5. A coating composition comprising a compound obtained by reacting an amino resin, which is an addition compound of an amino compound selected from the group consisting of urea, melamine, acetoguanamine, benzoguanamine, cyclohexane carboguanamine, steroguanamine and spiroguanamine and an aldehyde, with an organic polyphosphonic acid which is ethylenediaminetetra (methylenephosphonic acid), hexamethylenediaminetetra (methylenephosphonic acid) or diethylenetriaminepenta (methylenephosphonic acid).

* * * * *